Patented Apr. 30, 1935

1,999,614

UNITED STATES PATENT OFFICE 1,999,614

NEW PROCESS OF PREPARING AMINO-ALKYLSULPHONIC ACIDS

Otto Nicodemus and Walter Schmidt, Frankfort-on-the-Main-Hoechst, and Anton Ossenbeck, Cologne-Mulheim, and Ernst Tietze, Cologne-on-the-Rhine, Germany, assignors to General Aniline Works, Inc., New York, N. Y., a corporation of Delaware No Drawing. Application October 18, 1932, Serial No. 638,386. In Germany February 12, 1932

5 Claims. (Cl. 260—127)

The present invention relates to a new process of preparing aminoalkylsulphonic acids.

We have found that aminoalkylsulphonic acids are obtainable by causing a hydroxyalkylsulphonic acid of the following general formula:

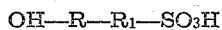

$$OH-R-R_1-SO_3H$$

wherein R and $R_1$ each stand for a divalent saturated aliphatic hydrocarbon radical, or a salt thereof, such as an alkali metal, ammonium or alkaline earth metal salt to react, in an autoclave, with ammonia or an aliphatic amine which compounds may be identified by the following general formula:

$$HN\begin{matrix}Y\\Y_1\end{matrix}$$

wherein Y and $Y_1$ stand for hydrogen or alkyl, in the presence of a compound of neutral or alkaline action which compounds must be good electrolytes. There may be used, for instance, the carbonates, sulphates, sulphites or phosphates of alkali metals, the chlorides or hydroxides of alkali metals or alkaline earth metals as, for instance, sodium carbonate, potassium carbonate, sodium sulphate, potassium sulphate, sodium sulphite, sodium phosphate, sodium hydroxide, potassium hydroxide, calcium hydroxide, sodium chloride, calcium chloride and others.

As aliphatic bases there may be used, for instance, methylamine, ethylamine, diethylamine, butylamine, ethylene diamine and other primary and secondary amines. All hydroxyalkylsulphonic acids and sulphonates are suitable for the purpose of our invention, special examples being: hydroxyethanesulphonic acid, hydroxybutanesulphonic acid, hydroxypropanesulphonic acid and hydroxypropanedisulphonic acid.

It will be observed that the free acids as well as their salts, such as the alkali metal, ammonium or alkaline earth metal salts may be used as starting materials. If the salts are used, it may be advantageous to work in an alcoholic or aqueous solution. The temperatures to be applied vary according to the nature of the starting materials used but generally temperatures of about 150° C. to about 300° C. are applied. The reaction takes place with elimination of water and replacement of the hydroxyl group by the amino- or alkylamino group. There are obtained, with a very good yield, a series of aminoalkylsulphonic acids which are valuable intermediate products, especially for the preparation of textile auxiliaries.

The process may be carried out in a continuous or discontinuous manner.

It has already been known to prepare aminoalkylsulphonic acids or the salts thereof by causing halogenalkylsulphonic acids or the salts thereof to react with ammonia or primary aliphatic amines. As compared with this process, the use of hydroxyalkylsulphonic acid according to the present invention offers the advantage that the reaction principally occurs between 1 mol of hydroxyalkylsulphonic acid and one mol of ammonia or of an amine. There are thus obtained when using, for instance, hydroxyalkylsulphonates, as main product, monoaminoalkylsulphonic acids whereas the reaction with halogenalkylsulphonic acids easily leads to di- or tri-substituted aminosulphonic acids.

The addition of the electrolytes of neutral or alkaline action causes that the reaction is further favorably influenced and that the yield of the products obtained is still increased.

The following examples serve to illustrate the invention but they are not intended to limit it thereto, the parts being by weight:

(1) 256 parts of hydroxyethane sodium sulphonate are heated in an autoclave with 800 parts of ammonia of 25% strength and 10 parts of sodium sulphate for 3 hours at about 210° C. to about 215° C. whereby the pressure rises to about 64 atmospheres. After distillation of the ammonia, there is obtained a mixture of amino- and imino-ethane sodium sulphonate with a yield of 87.5% of that of the theory.

Without addition of sodium sulphate there is obtained under the same conditions a yield of about 40% of that of the theory.

(2) 284 parts of hydroxyethane potassium sulphonate are heated with 1170 parts of an aqueous methylamine solution of 32% strength and 10 parts of secondary sodium phosphate for 3 hours at about 240° C. to about 245° C. under a pressure of about 71 to about 77 atmospheres. The methylamine is then driven off and there remains the potassium salt of methyltaurine in a yield of 70% of that of the theory: without addition of sodium phosphate there is obtained, under the same conditions, a yield of 57% of that of the theory.

(3) 256 parts of hydroxyethane sodium sulphonate are heated as in Example 1 with 800 parts of ammonia of 25% strength and 10 parts of sodium sulphite for 3 hours at about 210° C. to about 215° C. The product is worked up as usual and there is obtained a mixture of taurine and ditaurine sodium salts with a yield of 95% of that of the theory. By adding a smaller quantity of sodium sulphite, the yield is less good on account of the more feebly alkaline reaction; by adding, for instance, 3 parts of sodium sulphite there is obtained a yield amounting to 60% of that of the theory and by adding 6 parts of sodium sulphite there is obtained a yield amounting to 39% of that of the theory.

(4) By using in Example 3 10 parts of sodium carbonate instead of sodium sulphite, the product is obtained with a yield of 97% of that of the theory.

(5) 212 parts of hydroxyethane sulphonic acid are mixed with caustic potash solution of 50% strength until about 4% of caustic potash are present in excess. There are then added 940 parts of methylamine solution of 40% strength and the whole is heated for 3 hours at about 240° C. to about 245° C. The product is worked up as usual and there is obtained methyltaurine with a yield of 98.7% of that of the theory.

(6) 616 parts of hydroxyethane sulphonic sodium sulphonate of 96% strength are heated, after addition of 50 parts of caustic soda solution of 38% strength, with 2500 parts of aqueous methylamine solution of 30% strength for 3 hours at about 240° C. to about 254° C. whereby the pressure rises to about 80—about 85 atmospheres. The product is worked up as usual and there are obtained 562 parts of methyltaurine sodium salt which correspond with a yield of 87.3% of that of the theory.

We claim:

1. A process of preparing aminoalkylsulphonic acids which comprises heating in an autoclave a compound of the following general formula:

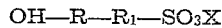
OH—R—R₁—SO₃X where R and R₁ each stand for a divalent saturated aliphatic hydrocarbon radical and X stands for hydrogen, NH₄, an alkali or an alkaline earth metal atom, with a compound of the following general formula:

wherein Y and Y₁ stand for hydrogen or alkyl in the presence of a compound of the group consisting of alkali metal salts and hydroxides and alkaline earth metal chlorides and hydroxides.

2. A process of preparing aminoalkylsulphonic acids which comprises heating in an aqueous solution a compound of the general formula:

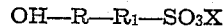
OH—R—R₁—SO₃X wherein R and R₁ each stand for a divalent saturated aliphatic hydrocarbon radical and X stands for hydrogen, NH₄, an alkali or an alkaline earth metal atom, with a compound of the general formula:

wherein Y and Y₁ stand for hydrogen or alkyl, in an autoclave at a temperature of about 150° C. to about 300° C. and in the presence of a compound of the group consisting of alkali metal salts and hydroxides and alkaline earth metal chlorides and hydroxides.

3. A process of preparing aminoalkylsulphonic acids which comprises heating in an aqueous solution a compound of the general formula:

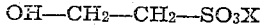
OH—CH₂—CH₂—SO₃X wherein X stands for hydrogen or an alkali metal atom, with a compound of the general formula:

wherein Y stands for hydrogen or alkyl, in an autoclave at a temperature of about 150° C. to about 300° C. and in the presence of a compound of the group consisting of alkali metal salts and hydroxides and alkaline earth metal chlorides and hydroxides.

4. The process which comprises heating hydroxyethane sodium sulphonate with methylamine in an aqueous solution and in an autoclave at a temperature of about 240° C. to about 245° C. in the presence of sodium hydroxide.

5. The process which comprises heating hydroxyethane sodium sulphonate with ammonia in an aqueous solution and in an autoclave at a temperature of about 210° C. to about 215° C. in the presence of sodium sulphate.

OTTO NICODEMUS.
WALTER SCHMIDT.
ANTON OSSENBECK.
ERNST TIETZE.